J. STUMPF.
UTILIZING THE ENERGY OF THE EXHAUST OF ENGINES.
APPLICATION FILED JUNE 5, 1917.
1,411,226.
Patented Mar. 28, 1922.
3 SHEETS—SHEET 1.
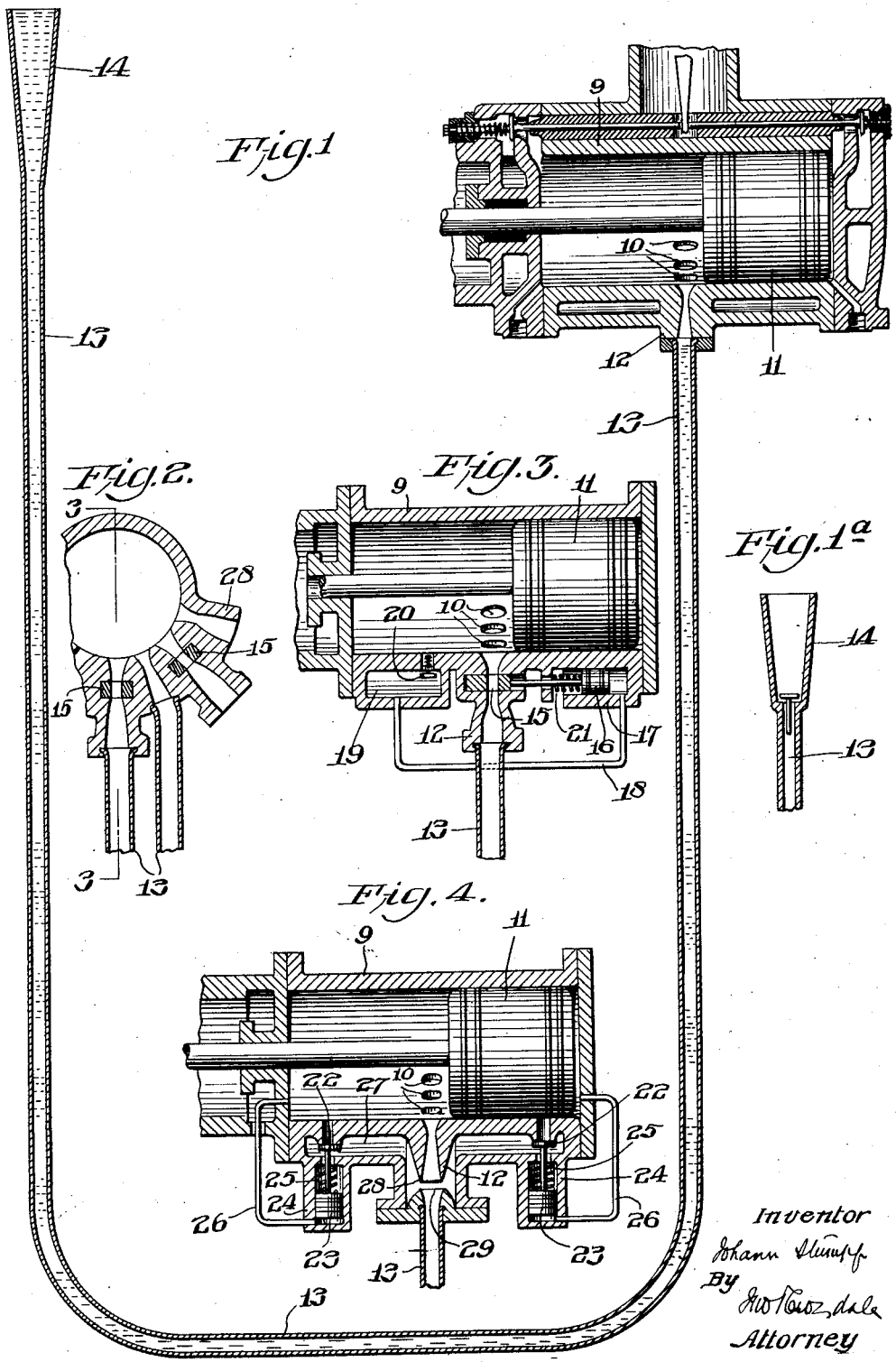

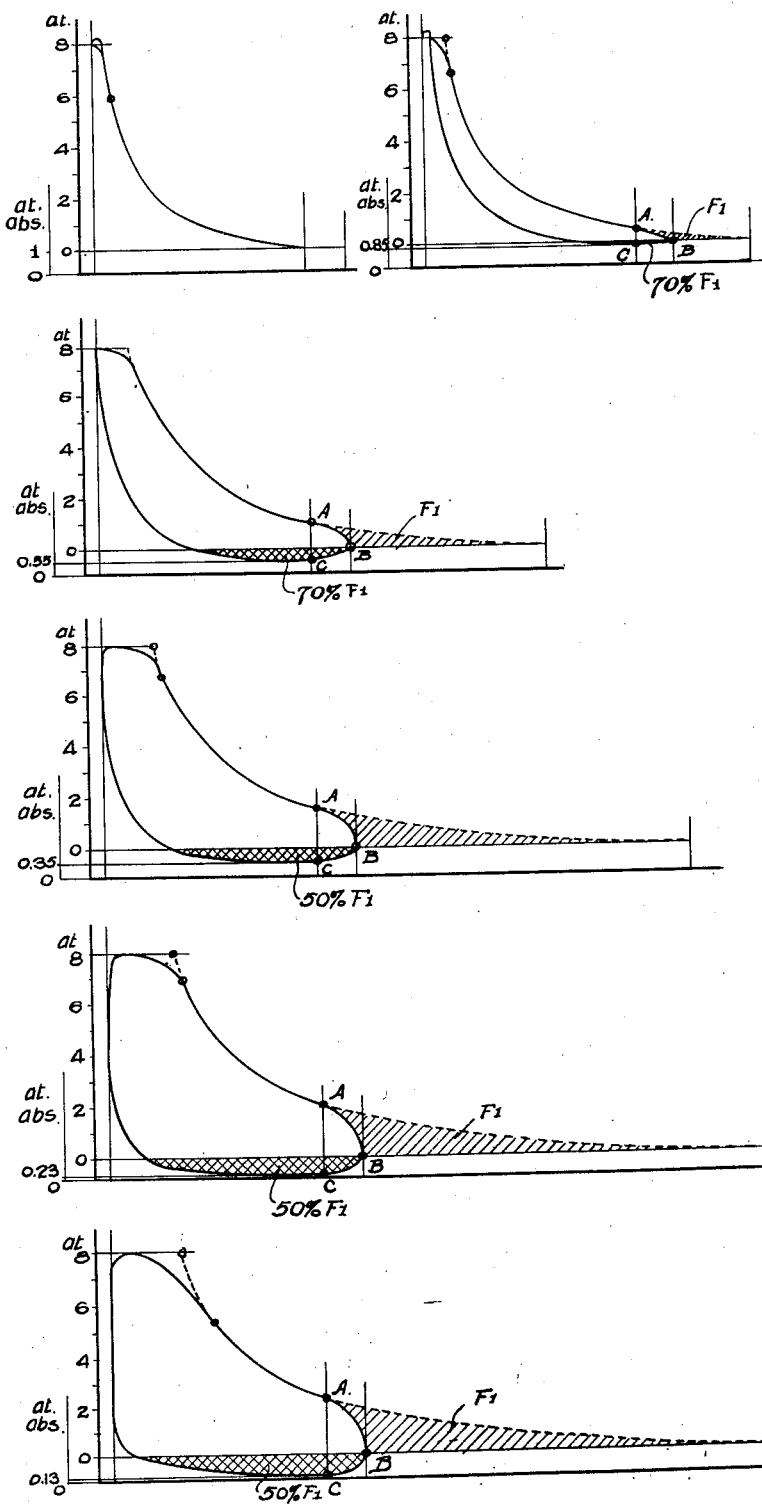

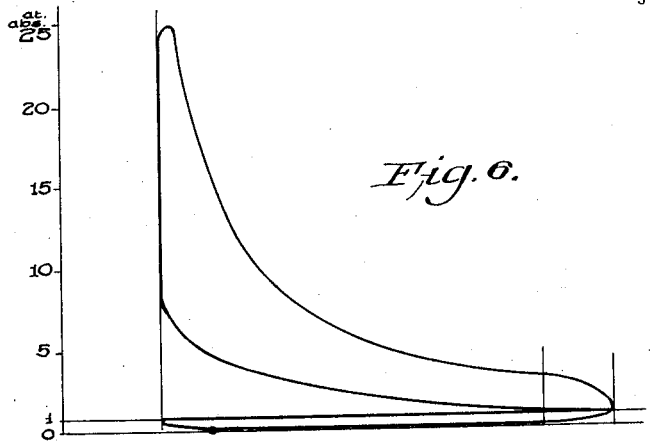
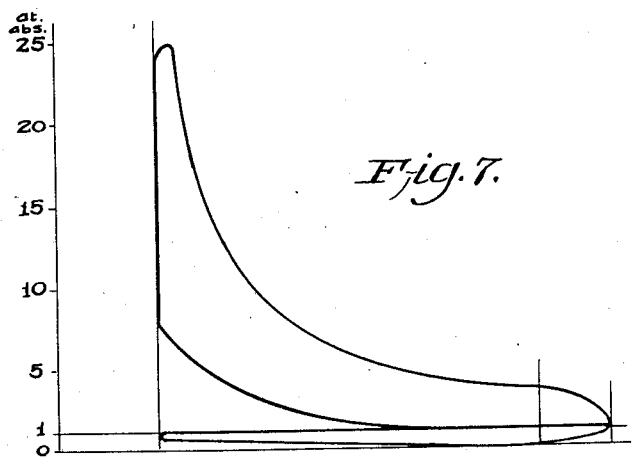
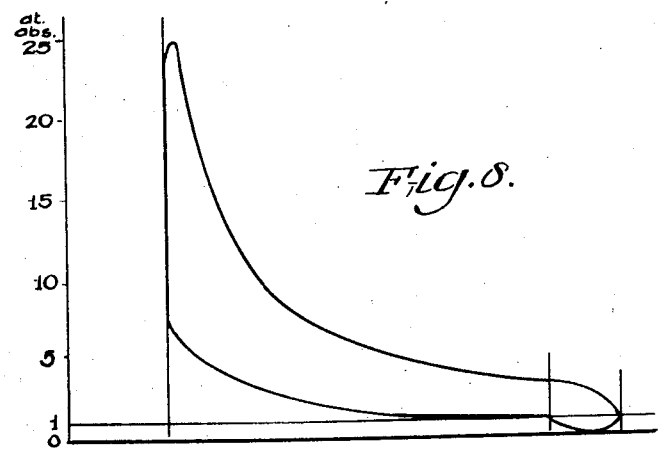

UNITED STATES PATENT OFFICE.

JOHANN STUMPF, OF BERLIN, GERMANY.

UTILIZING THE ENERGY OF THE EXHAUST OF ENGINES.

1,411,226.　　　　　Specification of Letters Patent.　　Patented Mar. 28, 1922.

Application filed June 5, 1917. Serial No. 173,068.

(GRANTED UNDER THE PROVISIONS OF THE ACT OF MARCH 3, 1921, 41 STAT. L., 1313.)

*To all whom it may concern:*

Be it known that I, JOHANN STUMPF, a citizen of the Commonwealth of Germany, residing in Berlin, Germany, have invented a new and useful Improvement in Utilizing the Energy of the Exhaust of Engines, of which the following is a specification.

The invention relates to method of and means for utilizing the energy of the exhaust of engines. The object is to provide method and means whereby the exhausting medium, in expanding through suitably arranged exhaust nozzles and conductor pipe or pipes, shall attain such kinetic energy as to enable them, according to the circumstances, to withdraw a greater or lesser part of the residual medium in the cylinder, thereby producing a pressure inside the cylinder less than the pressure against which the engine exhausts.

Referring to the drawings, which illustrate diagrammatically and merely by way of example, suitable apparatus for effecting my invention, and including a series of indicator cards which can be realized by the system described, Fig. 1 is a longitudinal section through a steam cylinder with an exhaust pipe.

Fig. 1ª is a sectional detail showing a non-return valve in the discharge pipe.

Fig. 2 is a cross-section of same showing a regulating device in the exhaust port area.

Fig. 3 is a longitudinal section on line 3—3 of Fig. 2.

Fig. 4 is a longitudinal section through a steam cylinder fitted with automatic auxiliary exhaust valves.

Fig. 5 comprises a series of indicator cards which can be realized by the new system.

Fig. 6 represents a four-cycle internal combustion engine card.

Fig. 7 is a similar four-cycle engine card.

Fig. 8 represents a two-cycle internal combustion engine card.

Similar numerals refer to similar parts throughout the several views.

In the drawings 9 represents a steam cylinder having exhaust ports 10 arranged in the middle part thereof, and a long piston 11 which opens and closes these ports shortly before and after the dead centre. The inside of the exhaust ports is generally rounded, as are the ends of the piston to form a nozzle like entrance and improve the flow of the exhausting medium.

Conical extensions 12 provided for each opening, further the expansion of the exhausting medium beyond the normal ratio of pressures. These nozzles 12 terminate into pipes 13 which are preferably free from sharp bends. According to the speed of the engine or the number of engines using the same pipe the length of these pipes will vary. The object is to have at any time a sufficient number of pressure waves generated by every individual exhaust proceeding through the pipe. These pressure waves will keep the content of the pipe in motion and will prevent the back-flow from the atmosphere.

The discharge end of pipe 13 is formed with a diffuser 14 which transforms velocity into pressure until atmospheric pressure is reached.

In case steam is used and the pipes 13 are placed in cool localities more or less of the steam will condense before leaving the pipe, then a check valve at the end of pipe 13 instead of a diffuser will serve as water outlet; in some cases a wet vacuum pump of the kind used with jet condenser might be useful to remove the water.

In order to obtain best results even with variable expansion pressures, provision is to be made to vary the exhaust port area. In Figs. 2 and 3 for instance, slide valves 15 are inserted between the inlet and the conical extensions of every nozzle which either full open or closed the respective nozzles. Connected to each valve 15 is a piston 16 which moves in a cylinder 17 receiving pressure through pipe 18 out of chamber 19. Check valve 20 admits steam from the cylinder into chamber 19; the location of this valve 20 is preferably near the exhaust ports 10. According to the length of the cut-off a certain pressure will build up in chamber 19 which has a constant relation to the terminal expansion pressure. In order to open the nozzle, piston 16 has to overcome the tension of spring 21, which requires a certain pressure in chamber 19. Several of the exhaust nozzles are equipped with such shut-off devices, every one of them with a different spring tension, so that, with increasing cut-off and accordingly increasing pressure, these nozzles will open in succession. The exhaust port area therefore will maintain a certain relation to the quantity of steam to be exhausted and this will produce indicator cards similar to those shown in Fig. 5.

Instead of using auxiliary steam piston to operate the nozzle slide valves the centrifugal governor of the engine can be used with the same result, or on engines having hand adjustable cut-off, some device might be developed to operate these nozzle valves from the hand lever or the rocker shaft which forms the transmission between steering lever and coulisse and other similar elements.

Another auxiliary device is shown in Fig. 4, which is also valuable for two-cycle or four-cycle internal combustion engines. It consists essentially of an auxiliary exhaust valve 22 at or near the cylinder end; the ports of these valves are over-run by the piston 11, and are placed at such a distance from the end of the stroke that the compression reaches the desired pressure. Each valve is fitted with piston 23 moving in cylinder 24 loaded by spring 25. The spring tends to open the valve, pressure is transmitted from cylinder 9 through pipe 26 to the lower part of cylinder 24. Overrunning these auxiliary ports, piston 11 will compress the residual steam and close the auxiliary valve 22 at the corresponding cylinder end. During admission and expansion, valve 22 will stay closed due to the high pressure inside of the cylinder, while, as soon as piston 11 opens exhaust ports 10, pressure is relieved and spring 25 begins to act; valve 22 then opens and stays open until piston 11, on the back stroke, again overruns its port and compresses its residual steam.

The chamber 27 communicates with the belt around the exhaust nozzles 10 and 12, which, in this case, are formed like an injector. Sharp edges 28 and 29, a certain distance apart, allow the steam from the auxiliary exhaust valves to be drawn out through the pipe 13, every time the exhaust ports 10 are opened by piston 11. Auxiliary valve 22 opens simultaneously and the high velocity of the exhausting steam exerts a sucking action upon the rest of the steam in the cylinder. This suction will continue on account of the kinetic energy-pressure waves moving through pipe 13, until piston 11, on its back-stroke, covers the auxiliary ports. In the long pipe 13 the exhausting medium will form waves, which are to exert a sucking action upon the residual steam inside the cylinder; depending upon the pressure inside the cylinder at the time of opening the exhaust nozzles, the expansion, acceleration and quantity of the exhaust gases will vary and in turn will vary the sucking action upon the residual steam. To illustrate this Fig. 5 shows indicator cards for different ratios of expansion. The loss of energy in the exhaust gases—due to incomplete expansion—is given by the simple shaded areas $F_1$, while in an engine as described the cross shaded areas, below the back pressure line, represent the gain due to withdrawing part of the residual steam from the cylinder. It is noticeable that this gain amounts to from 50 to 70% of the energy in the exhausted medium (area $F_1$). Point A of the expansion line indicates the opening of the exhaust ports; at B the pressure inside the cylinder has reached the back pressure and at C the pressure has dropped to its lowest figure due to the waves in the pipe line. Preferably the point C should coincide with the point of closing of exhaust ports by the piston. The total time, therefore, elapsed between points A and C divides into the time for exhausting from A to B and time for withdrawing from B to C. It is a matter of skill to find such a relation between time of exhaust and nozzle area on one side and quality of exhausting medium and speed of engine on the other, that the relative position of points A and B is such as to produce at point C, in which the exhaust ports are closed, the possible lowest pressure inside the cylinder. In other words to produce the maximum effect and to regain the highest percentage of exhaust energy.

The higher the speed of the engine and the higher the terminal expansion pressure, the larger will have to be the area of the exhaust ports and the earlier its opening before the dead center. For an engine with variable cut-off (constant speed assumed) either the exhaust port area or the time of its being opened—or both—will have to be varied. The same influence would have the change of speed.

The adjustment of the proper exhaust area can be done by opening or closing a greater or lesser number of exhaust nozzles in the cylinder wall. The latter, therefore, would open, with increasing cut-off, more and more of the nozzles. Another method would be to provide check valves, preferably close to the exhaust ports, which allow part of the working medium to pass from the cylinder into one or more separate chambers, the pressure in which then will vary accordingly with the cut-off. This pressure is made to act upon a system, which being under the influence of a spring of a certain tension and connected to the mechanism for closing or opening one or more exhaust nozzles, will open the latter if the pressure in said chambers is sufficiently high to overcome the spring tension. Such and other means make it possible to keep exhaust area and terminal expansion pressure in fixed proportion; thereby producing the best results. Still another means would be to provide exhaust ports at different distances from the dead center in combination with the piston controlled exhaust ports. These auxiliary exhaust ports at or near the cylinder ends may serve to lengthen the time for exhaust and to increase the amount of medium withdrawn; the medium leaving the cylinder through these valves should enter the exhaust pipe near the exhaust nozzles in a manner similar to an ejector (see Fig. 4).

In order to protect the suction, or sucking action, against the high pressure of the exhaust receiver it is admissible to provide for every exhaust nozzle a tube with smooth walls and free from sharp bends and of sufficient length so that at any moment a certain number of pressure waves are in motion from the nozzles to the exhaust receiver which on account of their kinetic energy will make impossible the backfire of the medium from the exhaust, or free atmosphere back to engine. The length of these tubes should increase with decreasing engine speed. Single acting engines will require longer tubes than double acting engines in which one set of tubes serves both ends of the cylinder. If there are two or more cylinders, with cranks under different angles, and using one set of exhaust pipes, these pipes may be shortened accordingly.

The end of these exhaust pipes is preferably formed by a conical tube or diffuser which will transform the rest of kinetic energy into pressure. Under perfect working conditions the final pressure in the diffuser should equal the pressure in the exhaust receiver or atmosphere. The action of such a diffuser is characterized by a steady increase of pressure with steady decrease of velocity and accordingly a following up of the pressure waves, which feature provides additional safety against backflow of the higher pressed exhaust gases.

Check valves at the outer end of the diffuser will further secure proper action and the use of such valves might be advisable with engines running at varying speed with varying cut-off or which have to stop frequently. It also might be possible to extend the diffuser action over the entire length of the exhaust pipe simply by sections of slightly increasing diameter.

The exhaust receiver can be the atmosphere, a condenser, a feed water heater, a heating system or anything alike. In case of free exhaust into the atmosphere it might often be possible to produce an indicator card almost similar to the one of a condensing engine with the result of getting the economy of a condensing engine without the use of a condenser, air pump and the like. Is the engine exhausting into a condenser then the application of the above methods would allow to bring the absolute pressure in the cylinder more or less below the condenser pressure; or in other words, to produce a certain vacuum would require less cooling water and less cooling surface; also a saving in pump work and cost of installation could be realized. The extreme case, however, would be to exhaust into free atmosphere and yet have high vacuum in the cylinder. This is possible to attain with sufficiently long cut-off and sufficiently high terminal expansion pressure, as shown in Fig. 5 lowest card.

The long exhaust pipes, mentioned above, might be arranged at the outside of a building whereby condensation could take place to a greater or lesser degree. The pipes also could be used to form a heating system for plants or dwellings; they also can be under the steady pour of cooling water. By all these means condensation could be effected to such an extent that instead of increasing the diameter from time to time, it could be reduced. The pressure waves of exhaust steam then would change into small plugs of water. The ends of these pipes of decreasing diameter should have check valves and should terminate into a water basin which arrangement would provide sufficient safety against backflow of water to the engine. To give the exhaust pipes the shape of a U of thirty or more feet height might still add to the reliability.

The losses encountered with this system embrace the loss in the nozzle, loss in the pipe line, diffuser loss and loss of impact at the point of mixture between medium flowing through the nozzle with high velocity and medium withdrawn from the cylinder. On the other hand this method opens the possibility to maintain a higher pressure in the heating system than the exhaust pressure of the engine and thereby increase the final temperature of the feed water, than could be done without this method of utilizing the exhaust energy.

In the same manner, this system serves to reduce the back pressure of steam engines, it can be utilized in four cycle internal combustion engines to reduce the back pressure during the exhaust stroke. It only being necessary to provide an auxiliary exhaust valve near the end of the cylinder which has a connection to the exhaust nozzles. The effect of an exhaust stroke with reduced pressure will be an amount of positive work done during this and the suction stroke. Without the use of said auxiliary exhaust valve compression of the residual medium in the cylinder will commence when the piston overruns the exhaust port though the compression pressure will stay below the atmosphere on account of the large clearance.

In two-cycle engines of the Diesel Koerting or other types the new system allows to simplify and at the same time to improve the scavenging without the use of separate scavenging pumps and their losses; width and area of the exhaust ports, however, have to be calculated so that at the point the piston shuts the exhaust ports not only the exhaust, but also the drawing in of new charge are completed. Also the pressure inside the cylinder should equal atmospheric pressure. In case the inlet valve is made to close later than the exhaust even a higher pressure can be obtained and in connection therewith an increased weight of charge with increased mean effective pressure. In other words, this method would replace the scavenging pumps in every respect.

Instead of using individual exhaust pipes for every nozzle, one common pipe of sufficient area might answer the purpose as well.

What I claim is:—

1. The method of utilizing the energy of the exhaust of engines, which consists in expanding the exhausting medium beyond the normal ratio of pressures, by discharging the same through a nozzle formed in the cylinder wall and delivering to an elongated conductor, said nozzle flaring toward the cylinder and toward the conductor, whereby pressure waves are formed in the body of the exhausting medium and the kinetic energy thereby developed therein is utilized to produce a pressure inside the cylinder less than the pressure against which the engine exhausts.

2. The method of utilizing the energy of the exhaust of engines, which consists in expanding the exhausting medium beyond the normal ratio of pressures by discharging the same through a suitably formed exhaust channel, whereby pressure waves are formed in the body of the exhausting medium and the kinetic energy thereby developed therein is utilized to produce a pressure inside the cylinder less than the pressure against which the engine exhausts, and controlling the exhaust port area so that the same shall be maintained in definite relation to the quantity of the medium to be exhausted.

3. The method of utilizing the energy of the exhaust of engines, which consists in expanding the exhausting medium beyond the normal ratio of pressures by discharging the same through a plurality of suitably formed exhaust channels, whereby pressure waves are formed in the body of the exhausting medium and the kinetic energy thereby developed therein is utilized to produce a pressure inside the cylinder less than the pressure against which the engine exhausts, and controlling the said several exhaust channels so that, as the pressure of the exhaust increases, the said channels shall open in succession.

4. Means for exhausting engine cylinders having a piston controlled exhaust port, comprising an elongated exhaust conductor and means forming an exhaust channel in the cylinder wall, flaring toward the cylinder and toward the exhaust conductor to further the expansion of the exhausting medium beyond the normal ratio of pressures, whereby pressure waves are formed in the body of the exhausting medium and the kinetic energy thereby developed therein is utilized to produce a pressure inside the cylinder less than the pressure against which the engine exhausts.

5. The combination defined in claim 4, in which the end of the piston is rounded to cooperate with the flaring entrance to the exhaust port to improve the flow of exhausting medium.

6. The combination defined in claim 4, in which the discharge end of the exhaust pipe is provided with a diffuser to transfer velocity to pressure.

7. Means for utilizing the energy of the exhaust of engine cylinders, comprising a cylinder having a piston controlled exhaust port, a long exhaust conductor so connected and proportioned as to expand, accelerate and conduct the exhausting medium so that it shall exert a sucking action upon the remaining content in the cylinder and means for enlarging and diminishing the exhaust port area for the purpose of altering the period for exhausting and withdrawing in the most suitable way.

8. The method of utilizing the energy of the exhaust of reciprocating engines using a cylinder having a piston controlled exhaust port which consists in expanding, accelerating and conducting the exhausting medium in such a way as to exert a sucking action on the remaining content in the cylinder and changing the time of beginning the exhaust before the dead centre and therewith the period of exhausting in the most suitable way.

9. Means for utilizing the energy of the exhaust of engine cylinders comprising a cylinder having piston controlled exhaust ports, a long exhaust conductor so connected and proportioned as to expand, accelerate and conduct the exhausting medium so that it shall exert a sucking action upon the remaining content in the cylinder and means for closing individual exhaust ports separately.

10. Means for utilizing the energy of the exhaust of engine cylinders comprising a cylinder having piston controlled exhaust ports, a long exhaust conductor so connected and proportioned as to expand, accelerate and conduct the exhausting medium so that it shall exert a sucking action upon the remaining content in the cylinder and means for opening and closing the exhaust ports automatically.

11. Means for utilizing the energy of the exhaust of engine cylinders, comprising a cylinder having piston controlled exhaust ports, a long exhaust conductor so connected and proportioned as to expand, accelerate and conduct the exhausting medium so that it shall exert a sucking action upon the remaining content in the cylinder, and means for opening and closing the exhaust ports automatically when operating under varying loads.

12. Means for utilizing the energy of the exhaust of engine cylinders, comprising a cylinder having piston controlled exhaust ports, a long exhaust conductor so connected and proportioned as to expand, accelerate and conduct the exhausting medium so that the kinetic energy of the exhausting medium shall exert a sucking action upon the remaining content in the cylinder, and valves operated by the pressure in the cylinder for opening and closing the exhaust ports.

13. Means for utilizing the energy of the exhaust of engine cylinders, comprising a cylinder having piston controlled exhaust ports, a long exhaust conductor so connected and proportioned as to expand, accelerate and conduct the exhausting medium so that the kinetic energy of the exhausting medium shall exert a sucking action upon the remaining content in the cylinder and valves operated by the pressure of the working medium for opening and closing the exhaust ports.

14. The combination of an engine cylinder having a piston controlled exhaust port, an elongated exhaust pipe, means forming a conical and flaring exhaust channel connecting the exhaust port of the cylinder with the exhaust pipe to further the expansion of the exhausting medium beyond the normal ratio of pressures, and means for controlling the exhaust channel so as to maintain the exhaust port area in definite relation to the quantity of medium to be exhausted.

15. The combination of an engine cylinder having a piston controlled exhaust port, an elongated exhaust pipe, means forming a conical and flaring exhaust channel connecting the exhaust port of the cylinder with the exhaust pipe to further the expansion of the exhausting medium beyond the normal ratio of pressures, and means for controlling the exhaust port so as to keep the exhaust-port-area and terminal expansion pressure in fixed proportion.

16. The combination of an engine cylinder having piston controlled exhaust ports, an elongated exhaust pipe, means forming conical and flaring exhaust channels connecting the exhaust ports of the cylinder with the exhaust pipe to further the expansion of the exhausting medium beyond the normal ratio of pressures, valves for closing the exhaust channels and valve-actuating means operating under different pressures and adapted to open in succession as the cut-off increases.

17. The combination of an engine cylinder having piston controlled exhaust ports, an elongated exhaust pipe, means forming conical and flaring exhaust channels connecting the exhaust ports of the cylinder with the exhaust pipe to further the expansion of the exhausting medium beyond the normal ratio of pressures, a plurality of exhaust-port-closing devices, actuating means therefor operating under relatively different pressures and adapted to actuate said closing devices in close sequence corresponding to the increase of pressure of the exhausting medium.

JOHANN STUMPF.